United States Patent
Ishikawa et al.

(10) Patent No.: US 7,984,164 B2
(45) Date of Patent: Jul. 19, 2011

(54) SERVER, AND PACKET TRANSFERRING METHOD AND PROGRAM THEREFOR

(75) Inventors: Yuichi Ishikawa, Minato-ku (JP); Ichiro Yamaguchi, Minato-ku (JP); Takayuki Hama, Minato-ku (JP)

(73) Assignee: NEC Corporation, Tokyo (JP)

( * ) Notice: Subject to any disclaimer, the term of this patent is extended or adjusted under 35 U.S.C. 154(b) by 256 days.

(21) Appl. No.: 12/348,507

(22) Filed: Jan. 5, 2009

(65) Prior Publication Data

US 2009/0177787 A1 Jul. 9, 2009

(30) Foreign Application Priority Data

Jan. 8, 2008 (JP) ................................. 2008-001164

(51) Int. Cl.
*G06F 15/16* (2006.01)
(52) U.S. Cl. ...................................................... 709/228
(58) Field of Classification Search ........... 709/227–229
See application file for complete search history.

(56) References Cited

U.S. PATENT DOCUMENTS

2002/0143922 A1* 10/2002 Tanimoto ...................... 709/223
2006/0047839 A1* 3/2006 Tate et al. ..................... 709/230
2008/0130900 A1* 6/2008 Hsieh ............................ 380/278

OTHER PUBLICATIONS

David A. Maltz, et al., "TCP Splicing for Application Layer Proxy Performance," Journal of High Speed Networks, 1999, pp. 225-240, vol. 8, issue 3.

* cited by examiner

*Primary Examiner* — Kevin Bates
*Assistant Examiner* — John M MacIlwinen
(74) *Attorney, Agent, or Firm* — Sughrue Mion, PLLC

(57) ABSTRACT

A server that relays packet data transmitted and received between a first terminal and a second terminal among plurality of terminals, includes a transfer table storing unit configured to store a transfer table in which a connection address pair, includes a first connection address and a second connection address, is registered, and a connection establishment message processing unit configured to transmit a SYN ACK message as a response message to a SYN message, upon receiving the SYN message, for establishing a TCP connection from each of the terminals. The first connection address is used to connect the server and the first terminal and the second connection address is used to connect the server and the second terminal.

21 Claims, 7 Drawing Sheets

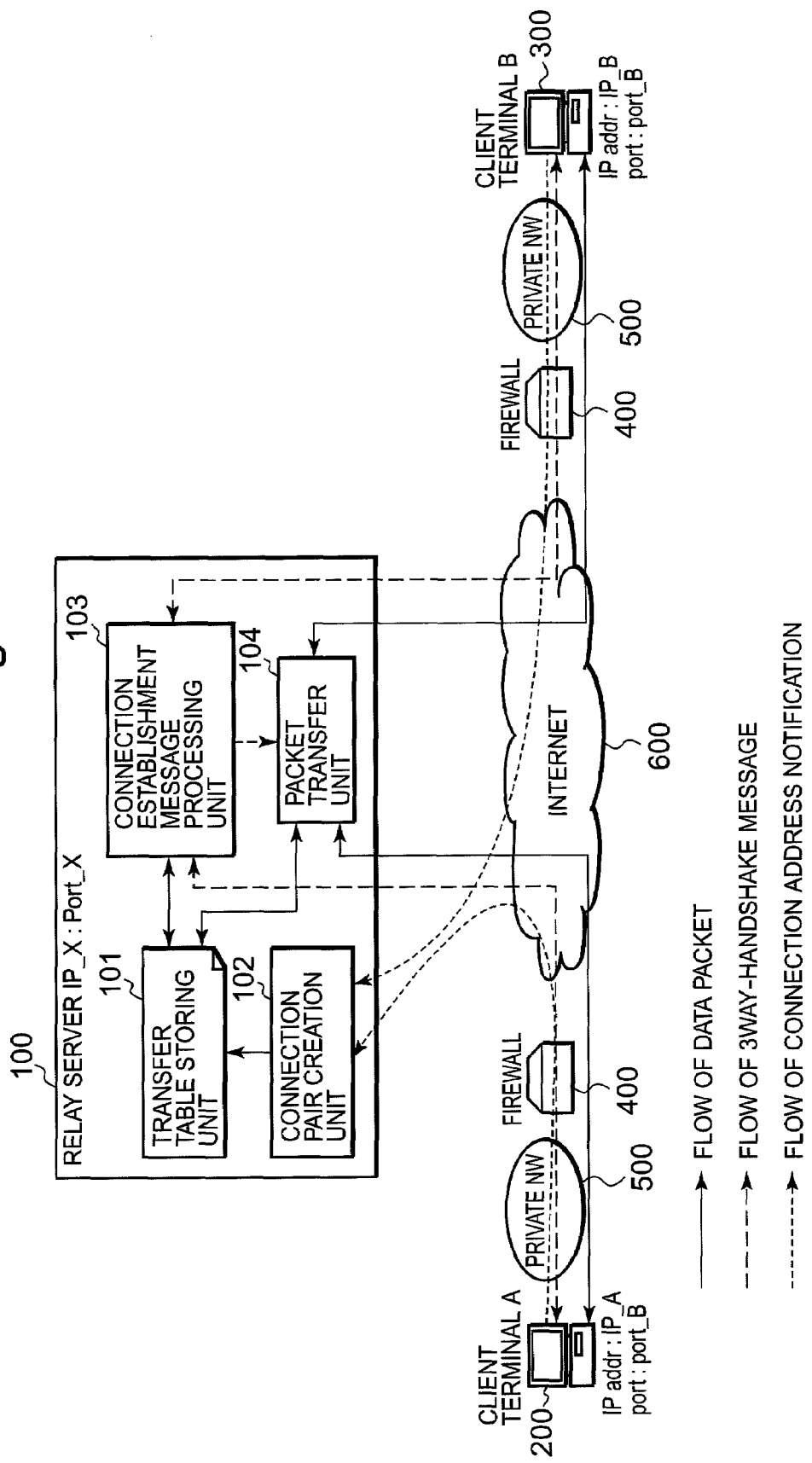

Fig. 2

| ENTRY NUMBER | CONNECTION ADDRESS INFORMATION | | | | TRANSFER START TIME SEQ# INFORMATION | | | | TCP OPTION INFORMATION | |
| --- | --- | --- | --- | --- | --- | --- | --- | --- | --- | --- |
| | CONNECTION 1 | | CONNECTION 2 | | CONNECTION 1 | | CONNECTION 2 | | CONNECTION 1 TCP OPTION | CONNECTION 2 TCP OPTION |
| | TERMINAL SIDE | SERVER SIDE | TERMINAL SIDE | SERVER SIDE | TERMINAL SIDE | SERVER SIDE | TERMINAL SIDE | SERVER SIDE | | |
| ... | ... | ... | ... | ... | ... | ... | ... | ... | | |
| X | IP_A:portA | IP_X:portX | IP_B:portB | IP_X:portX | a+1 | b+1 | d+1 | c+1 | MSS : 1460<br>WS : on 5<br>SACK : on | MSS : 1454<br>WS : on 3<br>SACK : on |
| ... | ... | ... | ... | ... | ... | ... | ... | ... | | |

101

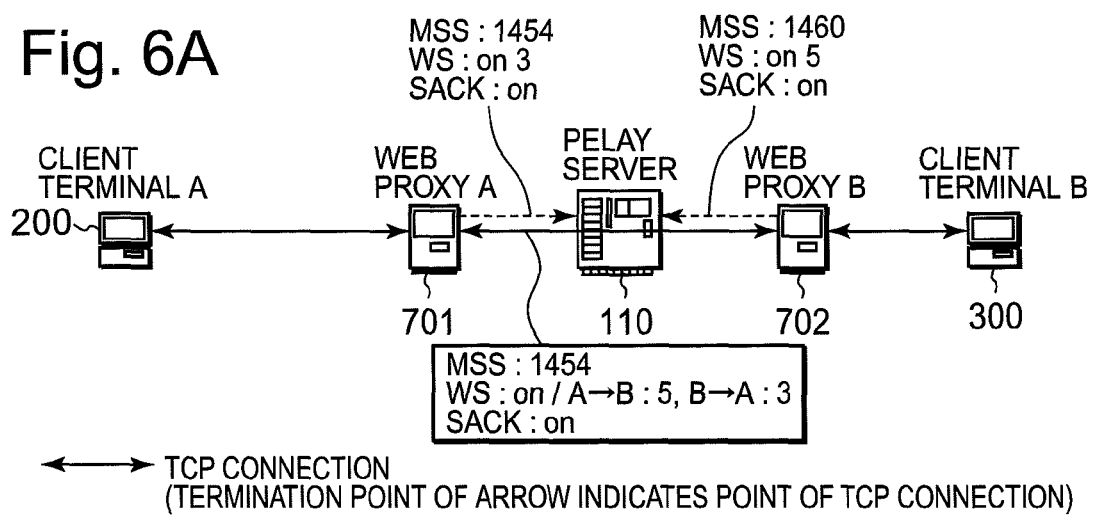
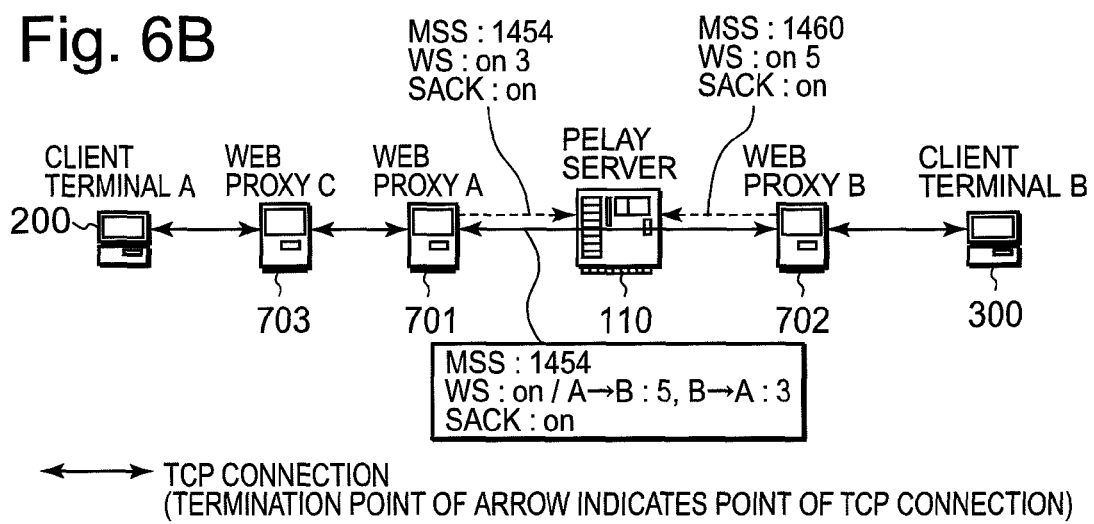
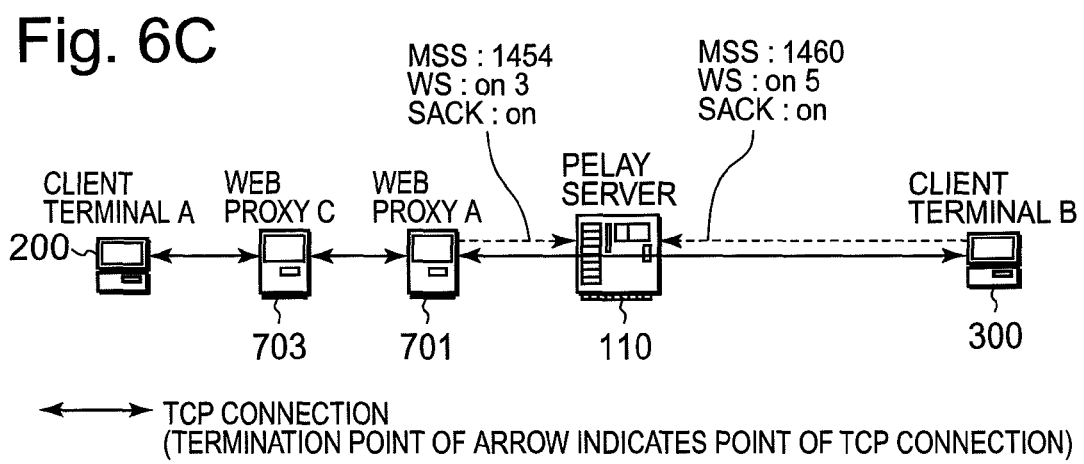

FIG. 7

| CONNECTION WAITING ADDRESS | IN USE FLAG |
|---|---|
| IP_X1 | TRUE |
| IP_X2 | TRUE |
| ... | ... |
| IP_Xn | FALSE |
| ... | |

115

US 7,984,164 B2

SERVER, AND PACKET TRANSFERRING METHOD AND PROGRAM THEREFOR

This application is based upon and claims the benefit of priority from Japanese patent application No. 2008-001164, filed on Jan. 8, 2008, the disclosure of which is incorporated in its entirety by reference.

BACKGROUND OF THE INVENTION

1. Technical Field

Aspects of the present invention relate to a server, and a packet transferring method and a program therefor to relay a packet transmitted and received between client terminals.

2. Description of the Related Art

In recent years, an increase of activities such as collaboration between companies and departments has led to diversification of business forms. Accordingly, there has been a rapid growth of needs for communication between client terminals connected to different company LANs or department LANs (namely, client terminals connected to different private networks). Considering such a background, there has been recently proposed a method for allowing communication between client terminals connected to different private networks. In a general system, communication between client terminals connected to different private networks is implemented via a relay server installed in a global network. A typical system using the above method includes SoftEther, Packetix VPN, OpenVPN and the like.

In general, a firewall that blocks communication from the global network is installed in the private network. The firewall is set to only allow the communication on a specific TCP connection (generally, TCP communication of a destination port number 80 used in Web browsing communication (namely, HTTP communication) and TCP communication of a destination port number 443 (namely, HTTPS communication)). The private network takes an initiative to establish such a specific TCP connection with the global network. Therefore, according to the general system, first, a client terminal on a private network starts to establish a TCP connection with a relay server. After the completion of the establishment of the TCP connection between the client terminal and the relay server, the client terminal and the relay server are already enabled to perform two-way communication. Thereafter, the client terminal transmits data intended to be delivered to a client terminal which is a communication partner, by using the TCP connection established with the relay server. The relay server transmits the received data by using the TCP connection established between the relay server and the client terminal which is the communication partner.

The aforementioned general system is hereinafter referred to as a firewall traversal communication system. According to the firewall traversal communication system, since the relay server terminates the TCP connection when transferring packets between the client terminals, the relay server needs to be subjected to a load for packet retransmission processing and flow control processing.

On the other hand, as a transfer system for data flowing on the TCP connection, there is a TCP splicing system. According to the TCP splicing system, a relay server rewrites the headers of packets and transfers the packets without performing TCP connection termination processing requiring a high processing load (see D. A. Maltz, et al. "TCP splice application layer proxy performance" Journal of High Speed Networks, Volume 8, Issue 3, 1999, p. 225-240; hereinafter "Maltz"), unlike the firewall traversal communication system.

FIG. 8 shows a packet transfer system described in Maltz. In FIG. 8, client terminals A 1000, B 2000 and a relay server 3000 are shown, and the client terminals A 1000 and B 2000 perform communication via the relay server 3000. First, the client terminal A 1000 transmits a SYN message to the relay server 3000 (S1000), and performs 3-Way-Handshake (hereinafter "3WH") (S1000 to S3000) to establish a TCP connection with the relay server 3000. The relay server 3000 registers information of the TCP connection established with the client terminal A 1000, to a packet transfer table 3100 provided therein. Moreover, after completing the establishment of the TCP connection with the client terminal A 1000, the relay server 3000 transmits a SYN message to the client terminal B 2000 (S4000), and performs 3WH (S4000 to S6000) to establish a TCP connection with the client terminal B 2000. After establishing the TCP connection with both client terminals A 1000 and B 2000, the relay server 3000 starts transferring a packet received from one of the TCP connections to the other connection (S7000).

The packet transfer is specifically performed as follows (S8000 to S9000). In the example of FIG. 8, regarding the two TCP connections established between the relay server 3000 and the respective client terminals A 1000 and B 2000, the following information is registered to the packet transfer table 3100:

Client-side IP address and port number;
Relay server-side IP address and port number; and
Which Seq number of packet is lastly transmitted by each of the client terminals and the relay server by using the TCP connections before start of transfer.

The relay server 3000 rewrites the Seq number, the Ack number, the transmission source IP address, the destination IP addresses and the port number of the packet received from one of the TCP connections (and a checksum recalculation accompanying the rewriting) and then transfers the rewritten packet to the other TCP connection. The relay server 3000 does not perform: buffering processing for retransmission packets that are prepared for a case of a packet loss, and are needed if the TCP connection is terminated; packet loss detection processing by analyzing the Seq numbers and Ack numbers of the received packets; packet retransmission processing accompanying a packet loss detection; flow control processing and the like. All of these processing are performed by the client terminals. Therefore, in the packet transfer system described in Maltz, a load applied to the relay server is reduced as compared with the firewall traversal communication system.

The problem of the system of the aforementioned Maltz is that no consideration is given to matching of TCP options between the client terminals that perform communication with each other via the relay server.

In general, TCP includes various options such as a maximum segment size ("MSS"), a window scale ("WS"), and a selective acknowledgment ("SACK"). If a communication is performed without any relay server, at the time of 3WH, both terminals serving as end terminals for the TCP connection matches these options by the SYN message and the SYN ACK message. For example, regarding MSS, the two terminals insert desired MSS values into the SYN message and the SYN ACK message, respectively, then transmit these messages, and use a smaller one of the MSS values, presented by themselves, to perform communication after the establishment of the TCP connection. Moreover, regarding WS, the two terminals each insert, into either the SYN message or the SYN ACK message, a flag ("WS use flag") indicating whether to use WS, and a shift count for a case where the WS is used. Then, when the WS use flag is ON in both terminals, WS is used in the communication after the establishment of the connection, and an advertised window size from the communication partner is calculated using a shift count value notified from the communication partner through either the SYN message or the SYN ACK message. Similarly, regarding SACK, a flag ("SACK use flag") indicating whether to use SACK is inserted to each of the SYN message and the SYN ACK message. Then, when the SACK use flag is ON in both terminals, SACK is used in the communication after the establishment of the connection.

According to the system described in Maltz, retransmission processing, flow control and the like after 3WH are performed between the client terminals and not between the client terminal and the relay server. Accordingly, the TCP options must be matched between the client terminals.

However, Maltz describes only the point that 3WH is performed between each client terminal and the relay server, and does not refer to the matching of TCP options between the client terminals. And, above described method for matching the TCP option is note be adapted for the system described in Maltz. For example, in FIG. 8, even when both the client terminals A 1000 and B 2000 transmit the SYN message and the SYN ACK message in which the WS use flag is ON at the time of 3WH, but if the relay sever 3000 transmits the SYN message and the SYN ACK message in which the WS use flag is OFF, each client terminal performs flow control without using WS in the TCP connection established with the relay server 3000. Accordingly, there is a possibility that communication throughput between the client terminals will be reduced as compared with the case using WS. Further, when the relay server transmits the SYN message and the SYN ACK message in which the WS use flag is ON to each client terminal, and if the WS use flag is ON at one client terminal while the WS use flag is OFF at the other client terminal, one client terminal intends to perform flow control using WS but the other client terminal intends to perform flow control without using WS. As a result, the flow control cannot be correctly performed between the client terminals. The same can be said to SACK. Particularly, WS and SACK largely affect the throughput of TCP connection. For this reason, when these options cannot be matched, the throughput may be largely reduced.

The above problem is true for a case in the firewall traversal communication system, in which two client terminals take initiatives to establish the TCP connection with the relay server.

SUMMARY OF THE INVENTION

An aspect of the present invention is to provide a server, and a packet transfer method and a program therefore to match TCP options between two client terminals, when the two client terminals each perform communication with each other via the sever.

Embodiments of the present invention also overcome disadvantages not described above and the present invention is not required to overcome the disadvantages described above. Indeed, embodiments of the present invention may not overcome any of the problems described above.

An aspect of the present invention concerning a server that relays packet data transmitted and received between a first terminal and a second terminal among a plurality of terminals, the server includes a transfer table storing unit configured to store a transfer table in which a connection address pair, comprising a first connection address and a second connection address, is registered, and a connection establishment message processing unit configured to transmit a SYN ACK message as a response message to a SYN message, upon receiving the SYN message, for establishing a TCP connection from each of the first terminal and the second terminal, wherein the first connection address is used to connect the server and the first terminal and the second connection address is used to connect the server and the second terminal, wherein, upon receiving the SYN message from the first terminal or the second terminal by using the first connection address or the second connection address, respectively, the connection establishment message processing unit generates a first SYN ACK message and transmits the first SYN ACK message by using the first connection address, and generates a second SYN ACK message and transmits the second SYN ACK message by using the second connection address, wherein the first SYN ACK message includes first TCP option information that is included in the SYN message received by using the second connection address of the connection address pair, and wherein the second SYN ACK message includes second TCP option information that is included in the SYN message received by using the first connection address of the connection address pair.

Another aspect of the present invention concerning a server that relays packet data transmitted and received between a plurality of terminals, the server includes a connection establishment message processing unit configured to transmit a SYN ACK message as a response message to a SYN message, upon receiving the SYN message, for establishing a TCP connection from each of the plurality of terminals, wherein, upon receiving a first SYN message, the first SYN message having a first source address and a first destination address, transmitted from one terminal of the plurality of terminals, the connection establishment message processing unit decides whether a second SYN message having a second source address and a second destination address, the second destination address being the same as the first destination address is already received, wherein, if the connection establishment message processing unit decides that the second SYN message is already received, the connection establishment message processing unit generates and transmits a first SYN ACK message and a second SYN ACK message, wherein the first SYN ACK message includes first TCP option information included in the first SYN message, a third source address that is the same as the second destination address, and a third destination address that is the same as the second source address, and wherein the second SYN ACK message includes second TCP option information included in the second SYN message, a fourth source address that is the same as the first destination address, and a fourth destination address that is the same as the first source address.

An aspect of the present invention concerning a packet transfer method, with which a server relays packet data transmitted and received between a plurality of terminals, the method includes a transfer table storing operation including storing a transfer table in which a connection address pair, including a first connection address and a second connection address, is registered, a connection establishment message processing operation including transmitting a SYN ACK message as a response message to a SYN message, upon receiving the SYN message, for establishing a TCP connection from each of the plurality of terminals, a SYN ACK message generating operation including generating a first SYN ACK message and a second SYN ACK message, upon receiving the SYN messages from a first terminal of the plurality of terminals by using the first connection address or from a second terminal of the plurality of terminals by using the second connection address, and a SYN ACK message transmitting operation including transmitting the first SYN ACK message by using the first connection, and the second SYN ACK message by using the second connection address, wherein the first connection address is used to connect the server and the first terminal and the second connection address is used to connect the server and the second terminal, wherein the first SYN ACK message includes first TCP option information that is included in the SYN message received by using the second connection address of the connection address pair, and wherein the second SYN ACK message includes second TCP option information that is included in the SYN message received by using the first connection address of the connection address pair.

Another aspect of the present invention concerning a packet transfer method, with which a server relays packet data transmitted and received between a plurality of terminals, the method includes a connection establishment message processing operation including transmitting a SYN ACK message as a response message to a SYN message, upon receiving the SYN message, for establishing a TCP connection from each of the plurality of terminals, a deciding operation including deciding whether a second SYN message having a second source address and a second destination address, the second destination address being the same as the first destination address is already received, upon receiving a first SYN message, the first SYN message having a first source address and a first destination address, transmitted from one terminal of the plurality of terminals, and a SYN ACK message generating operation including generating a first SYN ACK message and a second SYN ACK message, if the deciding operation decides that the second SYN message is already received, wherein the first SYN ACK message includes first TCP option information included in the first SYN message, a third source address that is the same as the second destination address, and a third destination address that is the same as the second source address, and wherein the second SYN ACK message includes second TCP option information included in the second SYN message, a fourth source address that is the same as the first destination address, and a fourth destination address that is the same as the first source address.

An aspect of the present invention concerning a computer readable medium having embodied thereon a program, which when executed by a computer, the program causes the computer, serving as a server that relays packet data transmitted and received between a plurality of terminals, to execute a method includes, storing a transfer table in which a connection address pair, comprising a first connection address and a second connection address, is registered, transmitting a SYN ACK message as a response message to a SYN message, upon receiving the SYN message, for establishing a TCP connection from each of the plurality of terminals, generating a first SYN ACK message and a second SYN ACK message, upon receiving the SYN messages from a first terminal of the plurality of terminals by using the first connection address or from a second terminal of the plurality of terminals by using the second connection address, and transmitting the first SYN ACK message by using the first connection, and transmitting the second SYN ACK message by using the second connection address, wherein the first connection address is used to connect the server and the first terminal and the second connection address is used to connect the server and the second terminal, wherein the first SYN ACK message includes first TCP option information that is included in the SYN message received by using the second connection address of the connection address pair, and wherein the second SYN ACK message includes second TCP option information that is included in the SYN message received by using the first connection address of the connection address pair.

Another aspect of the present invention concerning a computer readable medium having embodied thereon a program, which when executed by a computer, the program causes the computer, serving as a server that relays packet data transmitted and received between a plurality of terminals, to execute a method includes transmitting a SYN ACK message as a response message to a SYN message, upon receiving the SYN message, for establishing a TCP connection from each of the plurality of terminals, deciding whether a second SYN message having a second source address and a second destination address, the second destination address being the same as the first destination address is already received, upon receiving a first SYN message, the first SYN message having a first source address and a first destination address, transmitted from one terminal of the plurality of terminals, and generating a first SYN ACK message and a second SYN ACK message, if the deciding process decides that the second SYN message is already received, wherein the first SYN ACK message includes first TCP option information included in the first SYN message, a third source address that is the same as the second destination address, and a third destination address that is the same as the second source address, and wherein the second SYN ACK message includes second TCP option information included in the second SYN message, a fourth source address that is the same as the first destination address, and a fourth destination address that is the same as the first source address.

BRIEF DESCRIPTION OF THE DRAWINGS

The above and other aspects of the present invention will become more apparent from the following detailed description of embodiments taken in conjunction with the accompanying drawings, in which:

FIG. 1 is a diagram showing an example of a configuration of a first embodiment of the present invention.

FIG. 2 is a diagram showing an example of a transfer table according to the first embodiment of the present invention.

FIGS. 6A-6C are diagrams showing examples of establishing a TCP connection according to the second embodiment of the present invention.

FIG. 7 is a diagram showing an example of a vacant address management table according to the second embodiment of the present invention.

DETAILED DESCRIPTION OF EMBODIMENTS OF THE INVENTION

Hereinafter, embodiments of the present invention are described with reference to the drawings.

First, an example of configuration of a communication system according to a first embodiment of the present invention is described.

FIG. 1 shows an example of a configuration of the communication system according to the first embodiment of the present invention. The communication system according to the first embodiment includes a relay server 100, a client terminal A 200, a client terminal B 300, firewalls 400, private networks 500, and an Internet 600.

Figure 8:
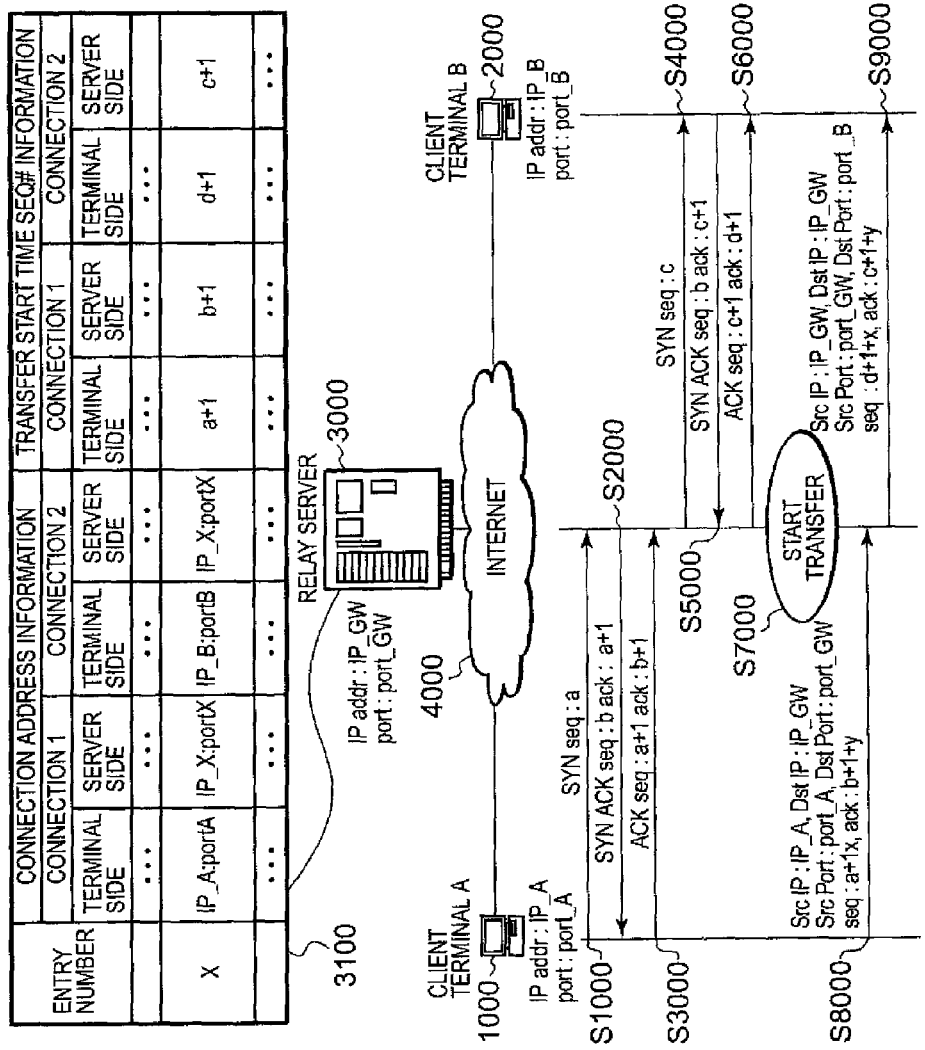
FIG. 8 is a diagram showing one example of TCP splicing packet transfer system.

The client terminal A 200 and the client terminal B 300 perform communication with each other using a TCP connection established with the relay server 100. In addition, unlike the system shown in FIG. 8, the client terminal A 200 and the client terminal B 300 may be directly connected to the Internet 600 instead of through the private networks 500.

The firewalls 400 are devices that block connection to the private networks 500 from an external unit, and for example, setting is made to allow only communication on TCP connection established from a terminal (client terminal A 200, client terminal B 300 or the like) connected to the private network 500 to a terminal connected to the Internet 600.

The relay server 100 includes a transfer table storing unit 101, a connection pair creation unit 102, a connection establishment message processing unit 103, and a packet transfer unit 104.

The transfer table storing unit 101 stores a transfer table. In the transfer table, information necessary for transferring a packet received from a client terminal is described. More specifically, upon receipt of the packet from the client terminal, the relay server 100 judges a packet transfer destination and performs a rewriting process of a packet header. Information necessary for the transfer destination determination and rewriting process is registered in the transfer table.

FIG. 2 shows an example of the transfer table stored in the transfer table storing unit 101. Referring to FIG. 2, in the transfer table, an entry number, connection address information, transfer start time Seq number information, and TCP option information are registered. Moreover, an example of an entry when the client terminal A 200 and the client terminal B 300 perform communication with each other via the relay server 100 is registered as an entry x.

Connection address information refers to an IP address and a port number (address information) of a TCP connection to be used when two client terminals to perform communication with another client terminal via the relay server 100. In the connection address information, address information of both the client terminal side and the relay server 100 side is described for each client terminal. For example, in the entry x in FIG. 2, connection address information of the TCP connection, which the client terminal A 200 established with the relay server 100, is registered as first connection address information of a connection 1. In the first connection address, the fact that the client terminal A 200 uses an IP address IP_A and a port number Port_A, and that the relay server 100 uses IP_X and Port_X is registered. Moreover, connection address information of the TCP connection, which the relay terminal 100 establishes with the client terminal B 300, is registered as second connection address information of a connection 2. In the second connection address information, the fact that the client terminal B 300 uses an IP address IP_B and a port number Port_B, and that the relay server 100 uses IP_X and Port_X, is registered. The first and second connection address information is registered as a connection address pair.

In the transfer start time Seq number information, there is registered a Seq number of packet which has been transmitted by the client terminal and the relay server 100 at the time when the relay server 100 starts processing for transferring a packet received from the client terminal to another client terminal. In the entry x in FIG. 2, information on the connection 1 side before the transfer start time is registered. Here, it is registered that the client terminal A 200 has transmitted packets up to Seq number: a+1 and the relay server 100 has transmitted packets up to Seq number: b+1.

In TCP option information, TCP option information presented to the relay server 100 by the client terminal is registered. In the entry x in FIG. 2, it is registered as information on the connection 1 side that MSS: 1460 bytes, WS: flag ON, 5-bit shift, and SACK: flag On, as presented by the client terminal A 200.

For the packet received by the relay server 100 from the client terminal, the connection pair creation unit 102 decides to which TCP connection a packet received from each TCP connection is to be transferred. Thereafter, the connection pair creation unit 102 registers connection address information of these TCP connections in the transfer table.

The connection pair creation unit 102 registers, in the transfer table, connection address information of TCP connections that two client terminals (client terminal A 200 and client terminal B 300 in the case of FIG. 1) performing communication use, before starting the transfer of the packet received from the client terminals. The following will explain an example of a specific registration method.

For example, the following method can be considered: An ID is allocated to each client terminal. Then, before each client terminal starts to perform communication with another client terminal, its ID, connection address information of the TCP connection to be used in communication with a communicating client terminal, and the ID of the communicating client terminal are notified to the connection pair creation unit 102. By this means, the connection pair creation unit 102 acquires connection address information of two client terminals that perform communication with each other, and registers the address information in the transfer table. For example, in the configuration shown in FIG. 1, when the client terminal A 200 and the client terminal B 300 perform communication with each other, the client terminal A 200 notifies the connection pair creation unit 102 of IP address: IP_A and TCP port number: Port_A, and the client terminal B 300 notifies the connection pair creation unit 102 of IP address: IP_B and TCP port number: Port_B in advance. Then, the client terminal A 200 notifies the connection pair creation unit 102 that the communication partner is the client terminal B 300 at the time of starting communication, and the connection pair creation unit 102 registers the above address information in the transfer table.

The address information items which the client terminal notifies the connection pair creation unit 102 in advance, may be plural. For example, the client terminal A 200 may notify IP address: IP_A and TCP port number: Port_A1 to n as address information, and the client terminal B 300 may notify IP address: IP_B and TCP port number: Port_B1 to n as address information, at one time. Then, when receiving notification that the client terminal A 200 wishes to communicate with the client terminal B 300, the connection pair creation unit 102 may select address information not in use from address information notified in advance, and notify each of the client terminal A 200 and the client terminal B 300 of address information to be used in communication between the client terminal A 200 and the client terminal B 300. Additionally, for example, If IP address: IP_A and TCP port number: Port_A1 are selected as address information that the client terminal A 200 is to use in communication with the client terminal B 300, when the client terminal A 200 communicates with a client terminal C, the connection pair creation unit 102 selects IP address: IP_A and TCP port number: Port_AX ($2<X\leq n$). By registering multiple address information items at one time, it is possible to skip steps for notifying the connection pair creation unit 102 of address information every time when communication between the client terminals is started.

The connection establishment message processing unit 103 performs transmission and reception of a message for establishing a TCP connection with a client terminal, that is, 3 Way-Handshake ("3WH"). Moreover, the connection establishment message processing unit 103 instructs the packet transfer unit 104 when to start the transmission of the packet received from the client terminal. The connection establishment message processing unit 103 also records, in the transfer table, Seq number to which data packets that have been transmitted by the client terminal and the relay server 100, by using the connection address used in transmitting and receiving the 3WH message before starting the transfer. The following explanation is given regarding the specific processing contents.

Figure 3:
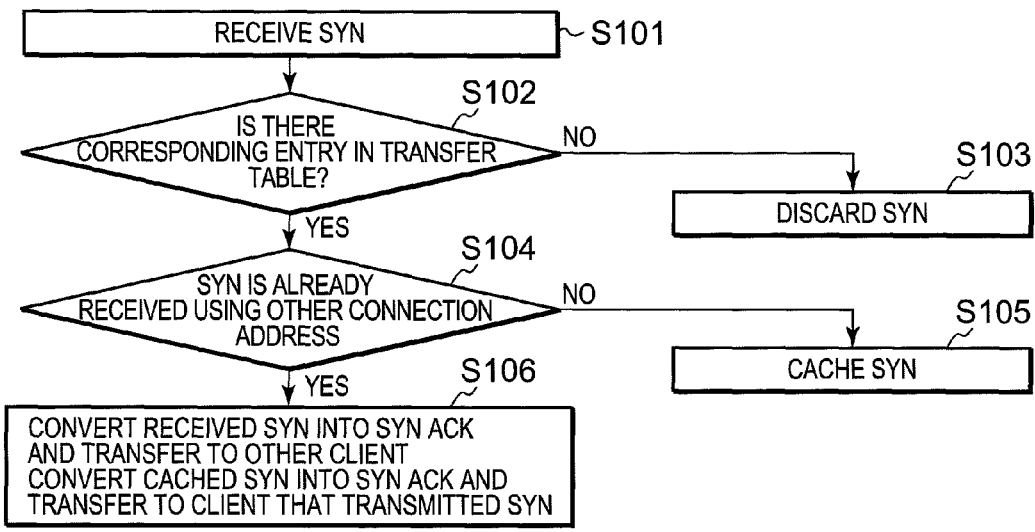
FIG. 3 is a diagram showing an example of a message sequence before starting data transfer according to the first embodiment of the present invention.

First, an explanation will be given of transmission and reception processing of the 3WH messages. FIG. 3 shows a processing flowchart of the connection establishment message processing unit 103 when a SYN message is received from the client terminal. When receiving a SYN message (S101), the connection establishment message processing unit 103 checks whether an entry ("SYN correspondence entry"), which has address information corresponding to connection address information (transmission source IP address, TCP port number, destination IP address, TCP port number) of the received SYN message, is registered in the transfer table storing unit 101 (step S102).

When no SYN correspondence entry is registered, the SYN message is discarded (S103). When it is registered, it is checked whether the SYN message is already received or not by using another connection address registered in the SYN correspondence entry (S104).

When the SYN message is not received, the content of the received SYN message is cached (S105). When it is already received, a SYN ACK message is generated based on a SYN message (newly received SYN correspondence cache message) having the same transmission source and destination address information as those of the connection address information registered in the SYN correspondence entry, the SYN message being among the SYN message (newly received SYN message) received in S101 and the cached SYN message. Then, the SYN ACK message is transmitted (S106).

For the newly received SYN correspondence cache message, the following SYN ACK message is generated and transmitted based on the newly received SYN message.
Transmission Source IP Address and Port Number
 Destination IP address and port number of newly received SYN correspondence cache message (namely, IP address and port number that are used by the relay server to receive newly received SYN correspondence cache message).
Destination IP Address and Port Number
 Transmission source IP address and port number of newly received SYN correspondence cache message.
Seq Number and Ack Number
 Seq number: randomly selected value. This may be the same value as Seq number of the newly received SYN message.
 Ack number: value obtained by adding 1 to Seq number of newly received SYN correspondence cache message.
TCP Option Information
 TCP option information of newly received SYN message.
Moreover, for the newly received SYN message, the following SYN ACK message is generated and transmitted based on the newly received SYN correspondence cache message.
Transmission Source IP Address and Port Number
 Destination IP address and port number of newly received SYN message (namely, IP address and port number that are used by the relay server to receive newly received SYN message).
Destination IP Address and Port Number
 Transmission source IP address and port number of newly received SYN message.
Seq Number and Ack Number
 Seq number: randomly selected value. This may be the same value as Seq number of the newly received SYN correspondence cache message.
 Ack number: value obtained by adding 1 to Seq number of newly received SYN message.
TCP Option Information
 TCP option information of newly received SYN correspondence cache message.

Next, an explanation will be given of an instruction on transfer start timing. After (not limited to immediately after) completing transmission and reception of the 3WH message between each client terminal and the relay server 100, an instruction is provided to the packet transfer unit 104 to start transferring the data packet.

A method can be adopted in which the relay server 100 analyzes the packet received from each client terminal and decides the timing to give the instruction, or a method can be adopted in which the client terminal transmits a special message for notifying the relay server 100 of timing at which the data packet is started to be transferred.

In the former case, it may be instructed that the transfer is started from the packet received just after completing exchange of the 3WH message, or the transfer is started from the last message of the 3WH message, that is, the packet (including ACK message itself after the ACK message corresponding to the SYN ACK message. Moreover, it may be instructed that the packet transfer is started after completing transmission and reception of the 3WH message, or after completing transmission and reception of a handshake message of SSL between each of the client terminals and the relay server 100.

Further, in the transfer table, there is registered a Seq number to which packets have been transmitted by each client terminal and the relay server 100 by communication with the relevant client terminal just before the start of data packet transfer.

The packet transfer unit 104 performs rewriting of an IP header and a TCP header of the packet that the relay server 100 has received from the client terminal, and transfers the packet to the other client. The specific processing content is as follows:

An entry which corresponds to the transmission source, destination IP addresses and the port number of the received packet, is searched from the transfer table. Then, the transmission source IP address, the transmission source port number, the destination IP address, the destination port number, Seq number and the Ack number are rewritten as follows with reference to the entry ("received packet correspondence entry"), and transmitted to the network after a checksum is recalculated.
Transmission Source IP Address and Port Number
 Among the connection addresses registered in the received packet correspondence entry is a connection address ("transfer destination connection address") not being a connection address used for receiving the packet ("transmission source connection address"). In the transfer table shown in FIG. 2, when the received packet correspondence entry is an entry x and the transmission source connection address is a connection address of connection 1, IP_X and Port_X of server-side address information of connection 2 side are used as a transmission source IP address and port numbers, respectively.
Destination IP Address and Port Number Address information on the terminal side of the transfer destination connection address is used as a destination IP address and a port number. In the aforementioned case, IP_B and Port_B are used.
Seq Number and Ack Number Seq number: Seq number of received packet−Seq number of client terminal side of transmission source connection described in received packet correspondence entry+Seq number of server side of transfer destination connection described in received packet correspondence entry.

Ack number: Ack number of received packet−Seq number of server side of transfer source connection described in received packet correspondence entry+Seq number of client terminal side of transfer destination connection described in received packet correspondence entry.

Next, an explanation is given regarding an operation of a communication system according to a first embodiment of the present invention.

An operation example when the client terminal A 200 and the client terminal B 300 communicate with each other via the relay server 100 according to the first embodiment is described as follows.

First, in the transfer table, by the aforementioned method or the like, there is registered connection address information that the client terminal A 200 and the client terminal B 300 use in communication between the client terminal A 200 and the client terminal B 300. For example, when the transfer table is formed in a format shown in FIG. 2, the IP address, IP_A and TCP port number Port_A of the client terminal A 200 are registered in the connection 1 side, and the IP address, IP_B and TCP port number Port_B of the client terminal B 300 are registered in the connection 2 side, as connection address information. IP address IP_X and the port number Port_X of the relay server 100 are also registered as server side address information. Additionally, in the example in FIG. 2, the server-side address information is shared between the connections 1 and 2, but may differ between the connections. Transfer start time Seq number information and TCP option information are not yet registered at this step.

Figure 4:
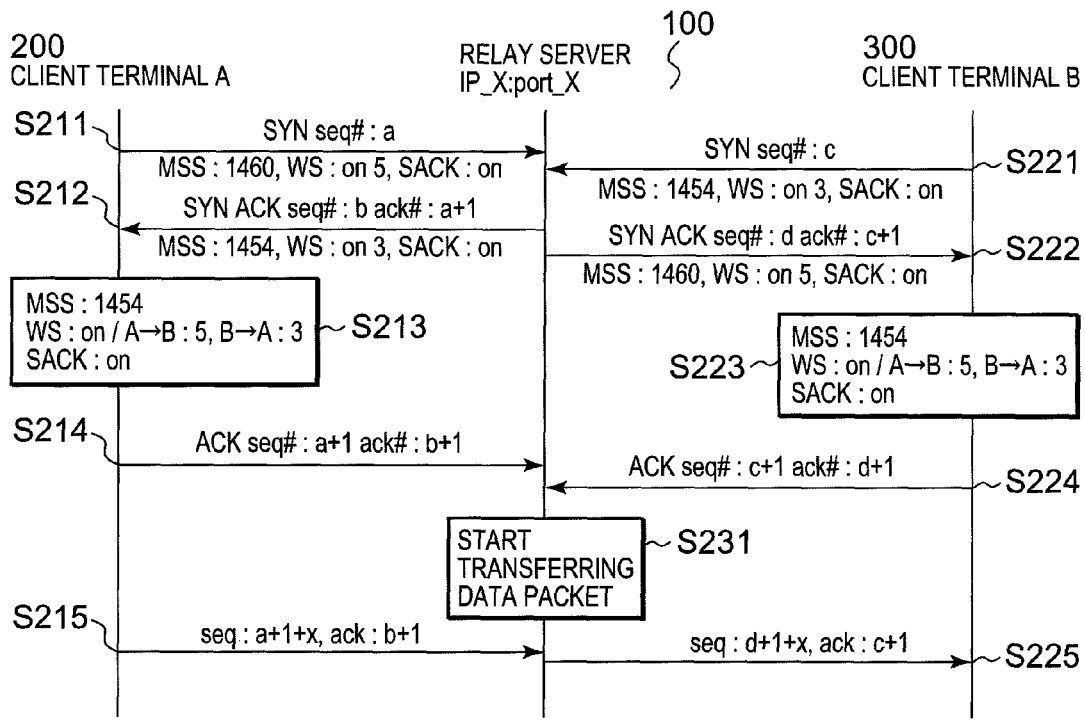
FIG. 4 is a diagram showing an operation flow when a connection establishment message processing unit receives a SYN message according to the first embodiment of the present invention.

Next, either the client terminal A 200 or the client terminal B 300 transmits a SYN message to the relay server 100. The following message sequence is shown in FIG. 4.

The client terminal A 200 transmits the SYN message to the relay server 100 from IP_A: Port_A. When the relay server 100 receives the message, the connection establishment message processing unit 103 searches the transfer table for an entry which has, in the connection address information, the same transmission source IP address, destination IP address and port numbers as the received SYN message. In this case, an entry of entry number x is searched. Moreover, the connection establishment message processing unit 103 registers, in the entry x, the TCP option information described in the received SYN message, that is, MSS: 1460 bytes, WS: flag ON, 5-byte shift, and SACK: flag On (S211).

Next, the connection establishment message processing unit 103 checks whether the SYN message is received from the other connection address information (namely, transmission source IP address IP-B, port number Port_B, destination IP address IP_X, and port number Port_X) registered in the entry x. Since the other connection address information is not yet received in the step S211, the SYN message is cached.

After S211, the client terminal B 300 transmits the SYN message to the relay server 100 from IP_B: Port_B. When the relay server 100 receives the message, the connection establishment message processing unit 103 searches the transfer table for an entry which has, in the connection address information, the same transmission source IP address, destination IP addresses and port numbers as the received SYN message. In this case, an entry of entry number x is searched. Moreover, the connection establishment message processing unit 103 registers, in the entry x, the TCP option information described in the received SYN message, that is, MSS: 1454 bytes, WS: flag ON, 3-byte shift, and SACK: flag On (S221).

Next, the connection establishment message processing unit 103 checks whether the SYN message is received from the other connection address information (namely, transmission source IP address IP-A, port number Port_A, destination IP address IP_X, and port number Port_X) registered in the entry x. Since the SYN message, having IP_A, Port_A as a transmission source and IP_X, Port_X as a destination, is already received in the step S211, a SYN ACK message is generated and transmitted. The following will describe the specific operation which takes place when the SYN ACK message is transmitted.

The connection establishment message processing unit 103 generates the following SYN ACK message and transmits it to the network.
Transmission Source IP Address and Port Number Regarding the SYN ACK message to be transmitted in response to the SYN message cached in S211, the destination IP address and port number (IP_X, Port_X) of the cached SYN message are set as transmission source IP address and port number, respectively. Regarding the SYN ACK message to be transmitted in response to the SYN message received in S221, the destination IP address and port number (IP_X, Port_X) of the received SYN message are set as transmission source IP address and port number, respectively.
Destination IP Address and Port Number Regarding the SYN ACK message to be transmitted in response to the SYN message cached in S211, the destination IP address and port number (IP_A, Port_A) of the cached SYN message are set as destination IP address and port number, respectively. Regarding the SYN ACK message to be transmitted in response to the SYN message received in S221, the destination IP address and port number (IP_B, Port_B) of the received SYN message are set as destination IP address and port number, respectively.
Seq Number and Ack Number The Seq number may be converted to a random value or one used in the cached or received message may be directly used.

Regarding the SYN ACK message to be transmitted in response to the SYN message cached in S211, Ack number (a+1), which is obtained by adding 1 to the Seq number of the cached SYN message, is set as the Ack number. Regarding the SYN ACK message to be transmitted in response to the SYN message received in S221, Ack number (c+1), which is obtained by adding 1 to the Seq number of the received SYN message, is set as the Ack number.
TCP Option Information Regarding the SYN ACK message to be transmitted in response to the SYN message cached in S211, TCP option information included in the SYN message received in S221 is included as TCP option information. Regarding the SYN ACK message to be transmitted in response to the SYN message received in S221, TCP option information included in the SYN message cached in S211 is included as TCP option information.

By these means, each of the client terminal A 200 and the client terminal B 300 receives the following SYN ACK message.

SYN ACK Message that the Client Terminal A 200 Receives (S212)

(1) Transmission source IP address: port number/destination IP address: port number IP_X: Port_X/IP_A:Port_A (2) Seq number, Ack number Seq number/Ack number: b/a+1

(3) TCP option

TCP option information presented by the client terminal B 300 based on the SYN message MSS: 1454 bytes, WS: flag On, 3-bit shift, SACK: flag ON SYN ACK Message that Client Terminal B 300 Receives (S222)

(1) Transmission source IP address: port number/destination IP address: port number IP_X: Port_X/IP_B:Port_B (2) Seq number and Ack number Seq number/Ack number: d/c+1

(3) TCP option

TCP option information presented by the client terminal A 200 based the SYN message MSS: 1460 bytes, WS: flag ON, 5-bit shift, and SACK: flag ON.

Based on the SYN ACK message in S212 and S222, TCP option information presented by the client terminal B 300 is presented to the client terminal A 200, and TCP option information presented by the client terminal A 200 is presented to the client terminal B 300, respectively. Therefore the client terminal A 200 and the client terminal B 300 can match option values of the TCP connection used in communication between the client terminal A 200 and the client terminal B 300. In the case of FIG. 4, the option values of the TCP connection are as follows: MSS: 1454 byte, WS: flag ON, Window size to be advertised from A to B: 5-bit shift, Window size to be advertised from B to A: 3-bit shift, and SACK: flag ON (S213, S223).

After matching the option values, the client terminal A 200 and the client terminal B 300 transmit the ACK message to the relay server 100, and exchange of the 3WH message between each of the client terminal A 200 and the client terminal B 300 and the relay server 100 is completed (S214, S224).

After completing the exchange of the 3WH message with each of the client terminal A 200 and the client terminal B 300, the relay server 100 starts transferring the data packet between the client terminal A 200 and the client terminal B 300. A method can be adopted in which the relay server 100 analyzes the packets received from the client terminal A 200 and the client terminal B 300 and decides the timing at which the data packet is started to be transferred. Also, a method can be adopted in which the client terminal A 200 and the client terminal B 300 transmit a special message for notifying the relay server 100 of timing at which the data packet is started to be transferred.

In the former case, as shown in FIG. 4, the transfer may be started from the packet received just after completing exchange of the 3WH message (S231), or the transfer may be started from the packets (including the ACK message itself) after the ACK message (S214, S215). Moreover, the packet transfer may be started after completing exchange of the 3WH message, or after completing exchange of a handshake message of SSL between the relay server 100 and each of the client terminal A 200 and the client terminal B 300.

The connection establishment message processing unit 103 registers, in the transfer table, how much each of the Seq number and Ack number has been incremented by communication with the client terminal A 200 and the client terminals 300 before the start of data packet transfer. In the example of FIG. 4, data packet transfer is started after reception of the ACK message in response to the SYN ACK message (S214, S224). Therefore, the following information are registered in the transfer table based on the Seq number and Ack number of the ACK message: Regarding the TCP connection of the client terminal A 200 side, the client terminal-side completes transmission up to Seq number: a+1, and the server-side completes transmission up to Seq number: b+1. Regarding the TCP connection of the client terminal B 300 side, the client terminal-side completes transmission up to Seq number: c+1, and the server-side completes transmission up to Seq number: d+1.

After starting the data packet transfer, an entry which corresponds to the transmission source IP address and port number of the received packet is searched from the transfer table (corresponding to entry x in the transfer table shown in FIG. 2), the transmission source IP address, the transmission source port number, the destination IP address, the destination port number, the Seq number and the Ack number are rewritten as follows with reference to the entry and transmitted to the network after a checksum is recalculated (S215, S225).

Transmission Source IP Address and Port Number

The transmission source IP address and port number of the packet received from each of the client terminal A 200 and the client terminal B 300 are converted into IP address and port number (IP_X: Port_X) of the relay server 100.

Destination IP Address and Port Number

The transmission source IP address and port number of the packet received from the client terminal A 200 are converted into that of address information (IP_B, Port_B) of the client terminal B 300. The transmission source IP address and port number of the packet received from the client terminal B 300 are converted into that of address information (IP_A, Port_A) of the client terminal A 200.

Seq Number and Ack Number (1) Seq number of packet received from client terminal A 200: Seq number of revived packet−Seq number of client terminal A 200 at the starting time of transfer which is described in entry x+Seq number of client terminal B at the starting time of transfer which is described in entry x.

In the case of S215, (a+1+x)−(a+1)+(d+1)

(2) Ack number of packet received from client terminal A 200: Ack number of received packet−Seq number of relay server 100 side in communication with client terminal A 200 at the starting time of transfer which is described in entry x+Seq number of relay server 100 side in communication with client terminal B 300 at the starting time of transfer which is described in entry x.

In the case of S215, (b−1)−(b+1)+(c+1)

(3) Seq number of packet received from client terminal B 300: Seq number of received packet−Seq number of client terminal B 300 at the starting time of transfer which is described in entry x+Seq number of client terminal A 200 at the starting time of transfer which is described in entry x.

(4) Ack number of packet received from client terminal B 300: Ack number of received packet−Seq number of relay server 100 side in communication with client terminal B 300 at the starting time of transfer which is described in entry x+Seq number of relay server 100 side in communication with client terminal A 200 at the starting time of transfer which is described in entry x.

As mentioned above, according to the first embodiment, in the communication system in which the client terminals perform communication with each other using the TCP connection established with the relay server, when the establishment of the TCP connection to the relay server from each client terminal is started, TCP option information described in the SYN message transmitted to the relay server by one client terminal is presented to the other client terminal, whereby the client terminals that perform communication via the relay server can match the TCP options with each other.

The reason for that is as follows: when receiving the SYN message from both client terminals that perform communication with each other, the connection establishment message processing unit in the relay server generates a SYN ACK message including TCP option information described in the SYN message received from one client terminal, and transmits the SYN ACK as a SYN ACK message in response to the SYN message received from the other client terminal.

Figure 5:
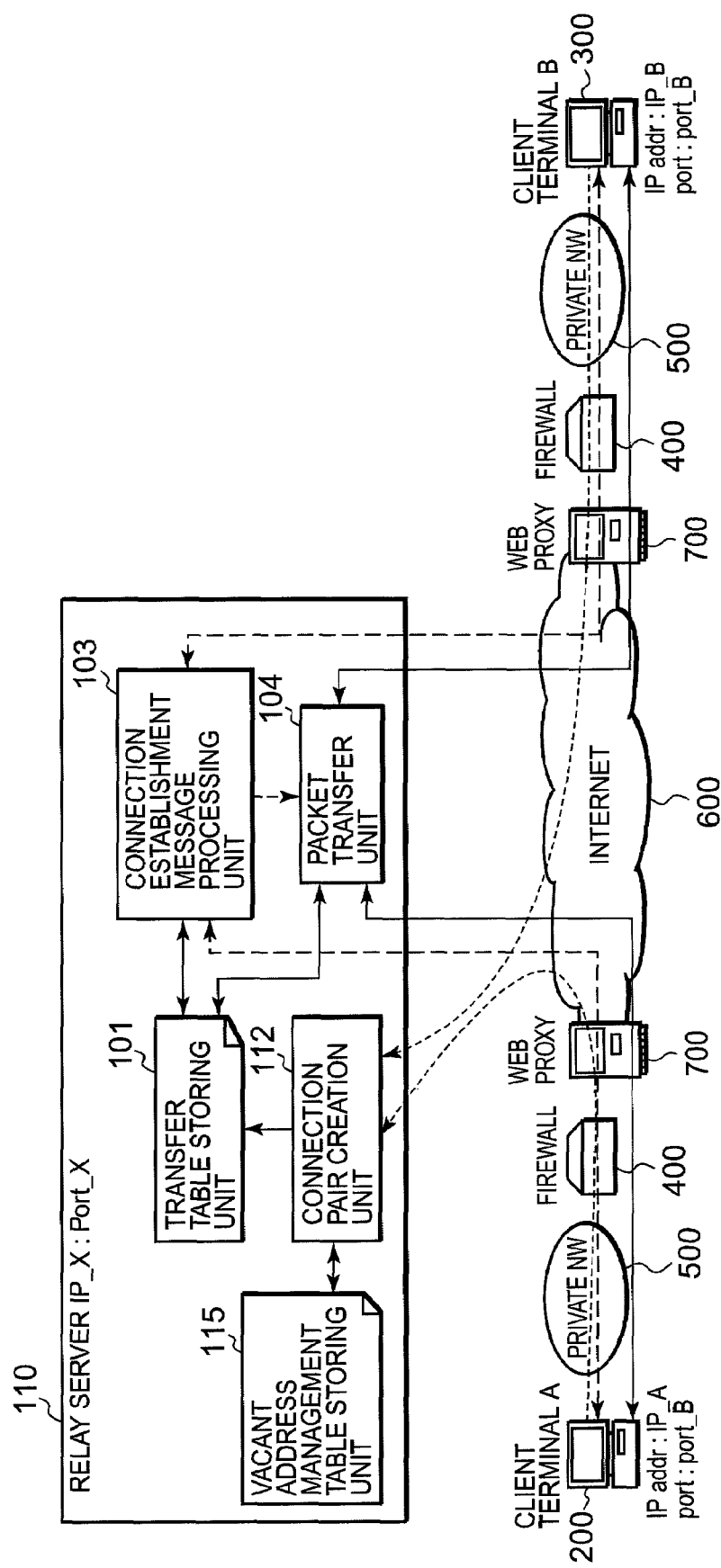
FIG. 5 is a diagram showing an example of a configuration of a second embodiment of the present invention.

Next, an explanation is given to a second embodiment of the present invention. FIG. 5 shows a configuration example of a communication system according to the second embodiment.

In the configuration shown in FIG. 5, a client terminal A 200 and a client terminal B 300 perform communication via a relay server 110. The client terminal A 200 and the client terminal B 300 cannot directly establish a TCP connection with the relay server 110, and they once establish a TCP connection with Web Proxies 700 and then the Web Proxies 700 establish a TCP connection with the relay server 110. Each of the client terminals transmits data to be transmitted to the communicating client terminal by using the TCP connection established with the respective Web Proxy 700. Thereafter, the Web Proxies 700 transfer data received at the TCP connection to a TCP connection established with the relay server 110. The relay server 110 receives data transmitted by each client terminal using the TCP connection established with the respective Web Proxy 700.

As in a configuration shown in FIG. 5, the second embodiment aims to match the TPC options between nodes (Web Proxies 700 in the case of FIG. 5) which directly establish the TCP connection with the relay server 110, even in a configuration in which the TCP connection is terminated between the relay server 110 and each client terminal (in example in FIG. 5, matching TCP options between Web Proxy 700 on the client terminal A 200 side and Web Proxy 700 on the client terminal B 300 side).

FIGS. 6A-6C show examples of TCP option matching achieved by the relay server 110 according to the second embodiment. It should be noted that it is assumed that the client terminal A 200 and the client terminal B 300 perform communication via the relay server 110 in each case shown in FIG. 6.

FIG. 6A shows a case where the TCP connection is terminated between the client terminal A 200 and the relay server 110 by a Web Proxy A 701, and the TCP connection is terminated between the client terminal B 300 and the relay server 110 by a Web Proxy B 702. In this case, the relay server 110 matches the TCP options between the Web Proxy A 701 and the Web Proxy B 702.

FIG. 6B shows a case where the TCP connection is terminated between the client terminal A 200 and the relay server 110 by a Web Proxy C 703 and the Web Proxy A 701, and the TCP connection is terminated between the client terminal B 300 and the relay server 110 by the Web Proxy B 702. In this case, the relay server 110 matches the TCP options between the Web Proxy A 701 and the Web Proxy B 702.

FIG. 6C shows a case where the TCP connection is terminated between the client terminal A 200 and the relay server 110 by the Web Proxy C 703 and the Web Proxy A 701. In this case, the relay server 110 matches the TCP options between the Web Proxy A 701 and the client terminal B 300.

In the first embodiment, before the relay server 100 receives the SYN message, the connection pair creation unit 102 registers, in the transfer table, connection address information used in communication between the client terminals, thereby judging a presentation destination of TCP option information presented by the SYN message (namely, a transmission destination of the SYN ACK message including TCP option information presented by the SYN message). However, in the second embodiment, there are cases where the presentation destination of TCP option information is not the client terminal, and this makes it impossible to grasp connection address information of the presentation destination before receiving the SYN message.

For example, in FIG. 6A, there is a need for transmitting the SYN ACK message which includes TCP option information presented by the SYN message from the Web Proxy A 701 to the transmission IP address and transmission source port number which are used when the Web Proxy B 702 transmits the SYN message to the relay server 110. However, the transmission source address information is automatically decided within the Web Proxy B 702 when the Web Proxy B 702 transmits the SYN message, and therefore it is impossible to judge the transmission source address information externally before transmitting the SYN message. Accordingly, the relay server 100 of the first embodiment can not deal with the configuration in which the TCP connection is terminated between the relay server 100 and the client terminal.

In the second embodiment, a method is adopted in which the relay server 110 judges a presentation destination of TCP option information based on destination address information of a received SYN message, in order to deal with the above case. In the second embodiment, the relay server 110 has one or more pairs of an IP address and port numbers ("TCP connection waiting address") used for reception of the SYN message, and a pair of client terminals that perform communication with each other first decides which TCP connection waiting address of the relay server 110 is used. The TCP connection waiting address which is used by the pair of client terminals that perform communication with each other is hereinafter called a "rendezvous address."

The client terminal requests each node in the middle, such as Web Proxy or the like serving as end terminals for the TCP connection established by the client terminal itself, to establish a TCP connection at the rendezvous address. When the client terminal can directly establish the TCP connection with the relay server 110, the client terminal itself directly transmits a SYN message to the rendezvous address.

The relay server 110 as a result receives two SYN messages directed to the same rendezvous address. The relay sever 110 generates a SYNACK message including the TCP information presented by the SYN message, and transmits the SYN ACK message to the transmission source address of the other SYN message directed to the same rendezvous address as the destination rendezvous address of the SYN message. By this means, matching of TCP options is achieved.

Hereinafter, a configuration of the relay server 110 in the second embodiment will be explained. Referring to FIG. 5, the relay server 110 of the second embodiment is different from the relay server 100 of the first embodiment in the point that a vacant address management table storing unit 115, which stores a vacant address management table, is provided.

FIG. 7 shows an example of the vacant address management table stored in the vacant address management table storing unit 115. In the vacant address management table, management is made of the TCP connection waiting address held by the relay server 110 and its usage state. It should be noted that only the IP address is described as the TCP connection waiting address in FIG. 7, but a pair of IP address and port number or only port numbers may be used. In the former case, the address is handled as a different address if the port numbers are different from each other, even if the IP addresses are the same. The usage state is updated by a connection pair creation unit 112.

When there is a pair of client terminals that are to perform communication with each other, the connection pair creation unit 112 searches the vacant address management table for a TCP connection waiting address not in use, and selects the TCP connection waiting address not in use as a rendezvous address. Thereafter the connection pair creation unit 112 notifies the client terminals of the rendezvous address. Here, as a notification method, a method is considered in which a mail is transmitted to the client terminal, or a Web page is separately provided and the client terminal gains access thereto to make a confirmation.

The connection pair creation unit 112 regards the usage state of the TCP connection waiting address which is selected as the rendezvous address as being used, and updates the vacant address management table. The connection pair creation unit 112 also registers, to the transfer table, the rendezvous address as server-side connection address information.

After notifying the client terminals of the rendezvous address, if the connection pair creation unit 112 receives SYN messages directed to the rendezvous address from two different transmission source addresses, the connection pair creation unit 112 registers, in the transfer table, the transmission source address of the SYN message as terminal-side connection address information.

The rendezvous address registered in the vacant address management table as in use is returned to rendezvous address not in use after the following operation. First, the SYN messages directed to the rendezvous address is received from two different transmission source addresses, and the relay server 100 transmits the SYN ACK message to the connection address used to receive the SYN message. Thereafter, the ACK message in response to the SYN ACK message is received, and the rendezvous address is returned to the not in use state at this point (namely, at the point where transmission and reception of the 3WH message is complete). By this means, it is possible to deal with a case where the SYN message is retransmitted due to packet loss or the like of the SYN ACK message.

The connection establishment message processing unit 103 and the packet transfer unit 104 perform similar processing as that of the first embodiment, and therefore their detailed explanations are omitted.

In the communication system of the second embodiment in which the client terminals perform communication via the relay server, considering a case where there are nodes ("TCP connection termination nodes") that terminate the TCP connection between the client terminal and the relay server. In this case, when the TCP connection termination nodes start to establish the TCP connection with the relay server, TCP option information described in the SYN message transmitted to the relay server by one TCP connection termination node is presented to the other TCP connection termination node, whereby TCP connection termination nodes can match the TCP options with each other.

The reason for this is as follows. The presentation destination of the TCP option included in the SYN message received by the relay server is judged from the destination address of the SYN message, and therefore even when the transmission address of the SYN message is not known in advance, it is possible to correctly judge the presentation destination of the TCP option included in the SYN message.

It should be noted that processing of the relay server 100 shown in FIG. 1 or that of the relay server 110 shown in FIG. 5 may be performed by a logic circuit manufactured according to its purpose. Moreover, a program describing the processing contents may be recorded on a recording medium that is readable by the relay servers 100 and 110. Thereby, the program recorded on the recording medium is read into the relay servers 100 and 110 and executed. The recording medium readable by the relay servers 100 and 110 indicates movable recording media such as a floppy disk (registered trademark), a magnetic optical disk, DVD, CD, and it also indicates HDD or the like which is built in the relay servers 100 and 110. The program recorded on the recording medium is read by a CPU (not shown) in the relay servers 100 and 110, and the same processing as mentioned above is performed by control of the CPU. Here, the relay servers 100 and 110 operate as computers that execute the program read from the recording medium on which the program is recorded.

As explained above, the embodiments of the present invention may have the following advantages.

The first advantage is as follows. In the communication system in which the client terminals perform communication via the relay server, when the establishment of the TCP connection to the relay server from each client terminal is started, TCP option information described in the SYN message transmitted to the relay server by one client terminal is presented to the other client terminal. Therefore, the client terminals that perform communication via the relay server can match the TCP options with each other.

The reason for this is as follows. The connection establishment message processing unit in the relay server generates a SYN ACK message including TCP option information described in the SYN message received from one client terminal, and transmits the SYN ACK as a SYN ACK message in response to the SYN message received from the other client terminal.

The second advantage is as follows. In the communication system in which the client terminals perform communication via the relay server, if there are TCP connection termination nodes that terminate the TCP connection between each of the client terminals and the relay server, when the TCP connection termination nodes start to establish the TCP connection with the relay server, TCP option information described in the SYN message transmitted to the relay server by one TCP connection termination node is presented to the other TCP connection termination node. Therefore, the TCP connection termination nodes can match the TCP options with each other.

The reason for this is as follows. The presentation destination of the TCP option included in the SYN message received by the relay server is judged from the destination address of the SYN message. Therefore even when the transmission address of the SYN message is not known in advance, it is possible to correctly judge the presentation destination of the TCP option included in the SYN message.

As explained above, according to the embodiments of the present invention, a configuration is adopted in which a SYN ACK message is generated that includes TCP option information included in a SYN message received by using one connection address of a connection pair having two connection addresses associated with each other, and the SYN ACK message is transmitted using the other connection address. Therefore, it is possible to prevent a reduction in throughput due to mismatching of TCP options between terminals that perform communication via a relay server.

While embodiments of the present invention have been described in detailed above, it is contemplated that numerous modifications may be made to the above embodiments without departing from the spirit and scope of the embodiments of the present invention as defined in the following claims.

What is claimed is:

1. A server including a hardware processor that relays packet data transmitted and received between a first terminal and a second terminal among a plurality of terminals, the server comprising:
   a transfer table storing unit configured to store a transfer table in which a connection address pair, comprising a first connection address and a second connection address, is registered; and
   a connection establishment message processing unit configured to transmit a SYN ACK message as a response message to a SYN message, upon receiving the SYN message, for establishing a TCP connection from each of the first terminal and the second terminal,
   wherein the first connection address is used to connect the server and the first terminal and the second connection address is used to connect the server and the second terminal,
   wherein, upon receiving the SYN message from the first terminal or the second terminal by using the first connection address or the second connection address, respectively, the connection establishment message processing unit generates a first SYN ACK message and transmits the first SYN ACK message by using the first connection address, and generates a second SYN ACK message and transmits the second SYN ACK message by using the second connection address,
   wherein the first SYN ACK message includes first TCP option information that is included in the SYN message received by using the second connection address of the connection address pair, and
   wherein the second SYN ACK message includes second TCP option information that is included in the SYN message received by using the first connection address of the connection address pair,
   wherein the first connection address includes an IP address and a port number of the first terminal, and an IP address and a port number of the server, and
   wherein the second connection address includes an IP address and a port number of the second terminal, and the IP address and the port number of the server.

2. A server including a hardware processor that relays packet data transmitted and received between a plurality of terminals, the server comprising:
   a connection establishment message processing unit configured to transmit a SYN ACK message as a response message to a SYN message, upon receiving the SYN message, for establishing a TCP connection from each of the plurality of terminals,
   wherein, upon receiving a first SYN message, the first SYN message having a first source address and port number of a first terminal and a first destination address of a server, transmitted from said first terminal of the plurality of terminals, the connection establishment message processing unit decides whether a second SYN message having a second source address and port number of a destination address and a second destination address of the server, the second destination address being the same as the first destination address, is already received,
   wherein, if the connection establishment message processing unit decides that the second SYN message is already received, the connection establishment message processing unit generates and transmits a first SYN ACK message and a second SYN ACK message,
   wherein the first SYN ACK message includes first TCP option information included in the first SYN message, a third source address that is the same as the second destination address, and a third destination address that is the same as the second source address, and
   wherein the second SYN ACK message includes second TCP option information included in the second SYN message, a fourth source address that is the same as the first destination address, and a fourth destination address that is the same as the first source address.

3. The server according to clam 2,
   wherein the first destination address comprises a first destination IP address and a first destination port number,
   wherein the second destination address comprises a first destination IP address and a first destination port number, and
   wherein, if the second destination IP address is the same as the first IP address and the second destination port number is the same as the first destination port number, the connection establishment message processing unit decides that the second SYN message is already received.

4. The server according to claim 2, further comprising:
   a vacant address management table storing unit configured to store a vacant address management table in which a TCP connection waiting address and a usage state of the TCP connection waiting address are registered in association with each other; and
   a connection pair creation unit configured to notify the one terminal of the TCP connection waiting address,
   wherein the TCP connection waiting address comprises an IP address and a port number which are used when the server receives the first SYN message.

5. The server according to claim 4,
   wherein, upon receiving a request for starting a communication from the one terminal, the connection pair creation unit notifies the one terminal of the TCP connection waiting address of which the usage state is registered as "not in use" in the vacant address management table.

6. The server according to claim 5,
   wherein the usage state of the TCP connection address is registered as "in use" in the vacant address management table, after the connection pair creation unit notifies the terminal of the TCP connection waiting address.

7. The server according to claim 4,
   wherein the usage state of the TCP connection waiting address is registered as "not in use" in the vacant address management table, after a transmission and reception of a 3-Way-Handshake message by using the TCP connection address are completed.

8. A packet transfer method, with which a server relays packet data transmitted and received between a plurality of terminals, the method comprising:
   a transfer table storing operation comprising storing a transfer table in which a connection address pair, comprising a first connection address and a second connection address, is registered;
   a connection establishment message processing operation comprising transmitting a SYN ACK message as a response message to a SYN message, upon receiving the SYN message, for establishing a TCP connection from each of the plurality of terminals;
   a SYN ACK message generating operation comprising generating a first SYN ACK message and a second SYN ACK message, upon receiving the SYN messages from a first terminal of the plurality of terminals by using the first connection address or from a second terminal of the plurality of terminals by using the second connection address; and a SYN ACK message transmitting operation comprising transmitting he first SYN ACK message by using the first connection, and the second SYN ACK message by using the second connection address, wherein the first connection address is used to connect the server and the first terminal and the second connection address is used to connect the server and the second terminal, wherein the first SYN ACK message includes first TCP option information that is included in the SYN message received by using the second connection address of the connection address pair, and wherein the second SYN ACK message includes second TCP option information that is included in the SYN message received by using the first connection address of the connection address pair, wherein the first connection address includes an IP address and a port number of the first terminal, and an IP address and a port number of the server, and wherein the second connection address includes an IP address and a port number of the second terminal, and the IP address and the port number of the server.

9. A packet transfer method, with which a server relays packet data transmitted and received between a plurality of terminals, the method comprising:

a connection establishment message processing operation comprising transmitting a SYN ACK message as a response message to a SYN message, upon receiving a first SYN message having a first source address and port number of a first terminal and a first destination address, for establishing a TCP connection from each of the plurality of terminals;

a deciding operation comprising deciding whether a second SYN message having a second source address and port number of a second terminal and a second destination address, the second destination address being the same as the first destination address, is already received, upon receiving said first SYN message; and a SYN ACK message generating operation comprising generating a first SYN ACK message and a second SYN ACK message, if the deciding operation decides that the second SYN message is already received, wherein the first SYN ACK message includes first TCP option information included in the first SYN message, a third source address that is the same as the second destination address, and a third destination address that is the same as the second source address, and wherein the second SYN ACK message includes second TCP option information included in the second SYN message, a fourth source address that is the same as the first destination address, and a fourth destination address that is the same as the first source address.

10. The packet transfer method according to clam 9,
wherein the first destination address comprises a first destination IP address and a first destination port number,
wherein the second destination address comprises a first destination IP address and a first destination port number, and
wherein, if the second destination IP address is the same as the first IP address and the second destination port number is the same as the first destination port number, the deciding operation decides that the second SYN message is already received.

11. The packet transfer method according to claim 9, further comprising:
a vacant address management table storing operation comprising storing a vacant address management table in which a TCP connection waiting address and a usage state of the TCP connection waiting address are registered in association with each other; and
a connection pair creation operation comprising notifying the one terminal of the TCP connection waiting address,
wherein the TCP connection waiting address comprises an IP address and a port number which are used when the server receives the first SYN message.

12. The packet transfer method according to claim 11,
wherein, upon receiving a request for starting a communication from the one terminal, the connection pair creation operation notifies the one terminal of the TCP connection waiting address of which the usage state is registered as "not in use" in the vacant address management table.

13. The packet transfer method according to claim 12, further comprising:
a first registering operation comprising registering the usage state of the TCP connection address as "in use" in the vacant address management table, after the connection pair creation unit notifies the terminal of the TCP connection waiting address.

14. The packet transfer method according to claim 11, further comprising:
a second registering operation comprising registering the usage state of the TCP connection waiting address as "not in use" in the vacant address management table, after a transmission and reception of a 3-Way-Handshake message by using the TCP connection address are completed.

15. A non-transitory computer readable medium having embodied thereon a program, which when executed by a computer, the program causes the computer, serving as a server that relays packet data transmitted and received between a plurality of terminals, to execute a method comprising:

storing a transfer table in which a connection address pair, comprising a first connection address and a second connection address, is registered;

transmitting a SYN ACK message as a response message to a SYN message, upon receiving the SYN message, for establishing a TCP connection from each of the plurality of terminals;

generating a first SYN ACK message and a second SYN ACK message, upon receiving the SYN messages from a first terminal of the plurality of terminals by using the first connection address or from a second terminal of the plurality of terminals by using the second connection address; and transmitting the first SYN ACK message by using the first connection, and transmitting the second SYN ACK message by using the second connection address, wherein the first connection address is used to connect the server and the first terminal and the second connection address is used to connect the server and the second terminal, wherein the first SYN ACK message includes first TCP option information that is included in the SYN message received by using the second connection address of the connection address pair, and wherein the second SYN ACK message includes second TCP option information that is included in the SYN message received by using the first connection address of the connection address pair, wherein the first connection address includes an IP address and a port number of the first terminal, and an IP address and a port number of the server, and wherein the second connection address includes an IP address and a port number of the second terminal, and the IP address and the port number of the server.

16. A non-transitory computer readable medium having embodied thereon a program, which when executed by a computer, the program causes the computer, serving as a server that relays packet data transmitted and received between a plurality of terminals, to execute a method comprising:

transmitting a SYN ACK message as a response message to a SYN message, upon receiving a first SYN message having a first source address and port number of a first terminal and a first destination address, for establishing a TCP connection from each of the plurality of terminals;

deciding whether a second SYN message having a second source address and port number of a second terminal and a second destination address, the second destination address being the same as the first destination address, is already received, upon receiving said first SYN message, generating a first SYN ACK message and a second SYN ACK message, if the deciding process decides that the second SYN message is already received, wherein the first SYN ACK message includes first TCP option information included in the first SYN message, a third source address that is the same as the second destination address, and a third destination address that is the same as the second source address, and wherein the second SYN ACK message includes second TCP option information included in the second SYN message, a fourth source address that is the same as the first destination address, and a fourth destination address that is the same as the first source address.

17. The computer readable medium according to clam 16, wherein the first destination address comprises a first destination IP address and a first destination port number, wherein the second destination address comprises a first destination IP address and a first destination port number, and wherein, if the second destination IP address is the same as the first IP address and the second destination port number is the same as the first destination port number, the deciding process decides that the second SYN message is already received.

18. The computer readable medium according to claim 16, wherein the method further comprises:

storing a vacant address management table in which a TCP connection waiting address and a usage state of the TCP connection waiting address are registered in association with each other; and notifying the one terminal of the TCP connection waiting address, wherein the TCP connection waiting address comprises an IP address and a port number which are used when the server receives the first SYN message.

19. The computer readable medium according to claim 18, wherein, upon receiving a request for starting a communication from the one terminal, the connection pair creation process notifies the one terminal of the TCP connection waiting address of which the usage state is registered as "not in use" in the vacant address management table.

20. The computer readable medium according to claim 19, wherein the method further comprises:

registering the usage state of the TCP connection address as "in use" in the vacant address management table, after the connection pair creation unit notifies the terminal of the TCP connection waiting address.

21. The computer readable medium according to claim 18, wherein the method further comprises:

registering the usage state of the TCP connection waiting address as "not in use" in the vacant address management table, after a transmission and reception of a 3-Way-Handshake message by using the TCP connection address are completed.

* * * * *